Jan. 2, 1968             W. M. GRIM             3,361,306
AEROSOL UNIT DISPENSING UNIFORM AMOUNTS
OF A MEDICALLY ACTIVE INGREDIENT
Filed March 31, 1966             3 Sheets-Sheet 1
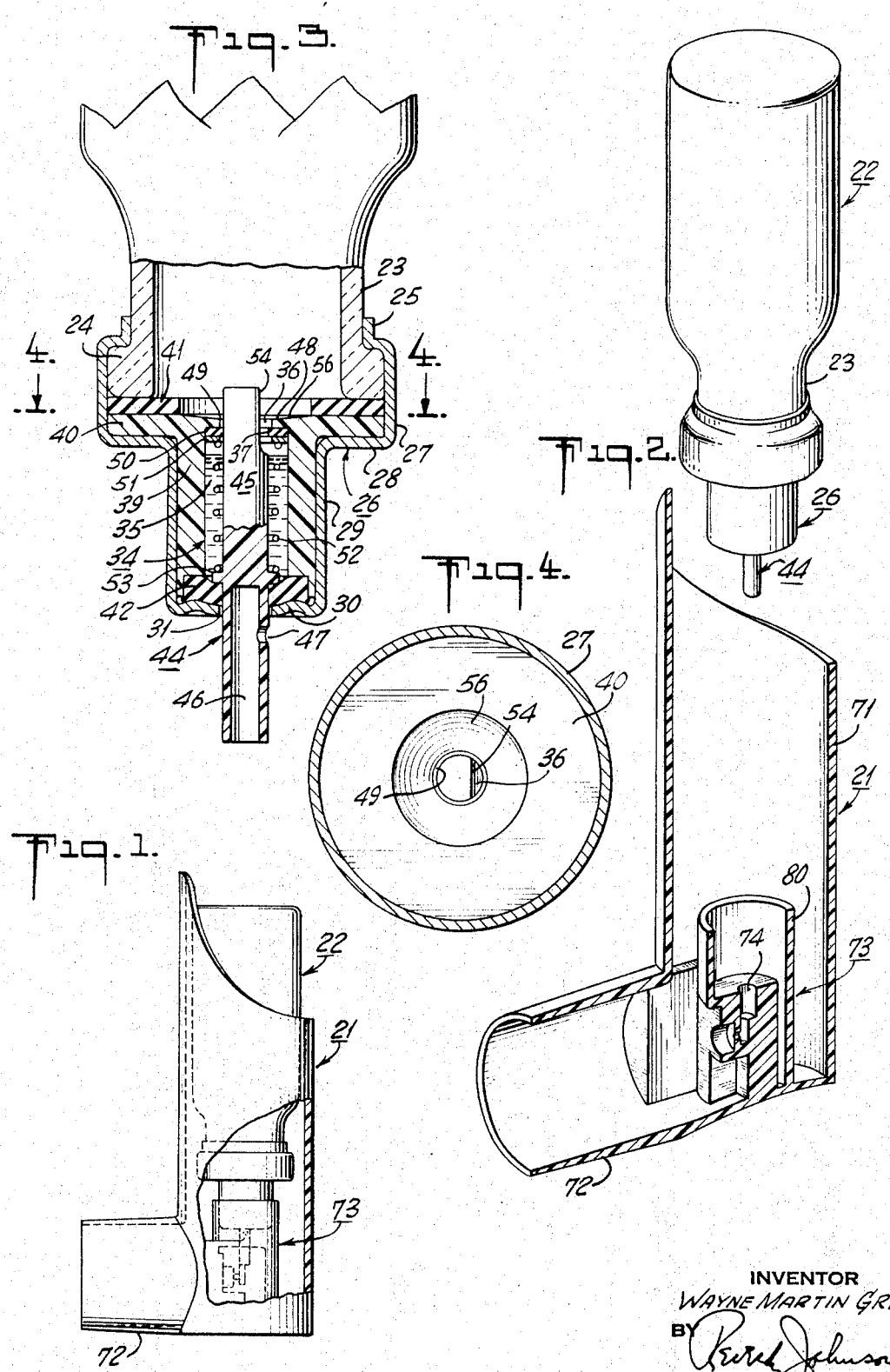
INVENTOR
WAYNE MARTIN GRIM
BY
ATTORNEY

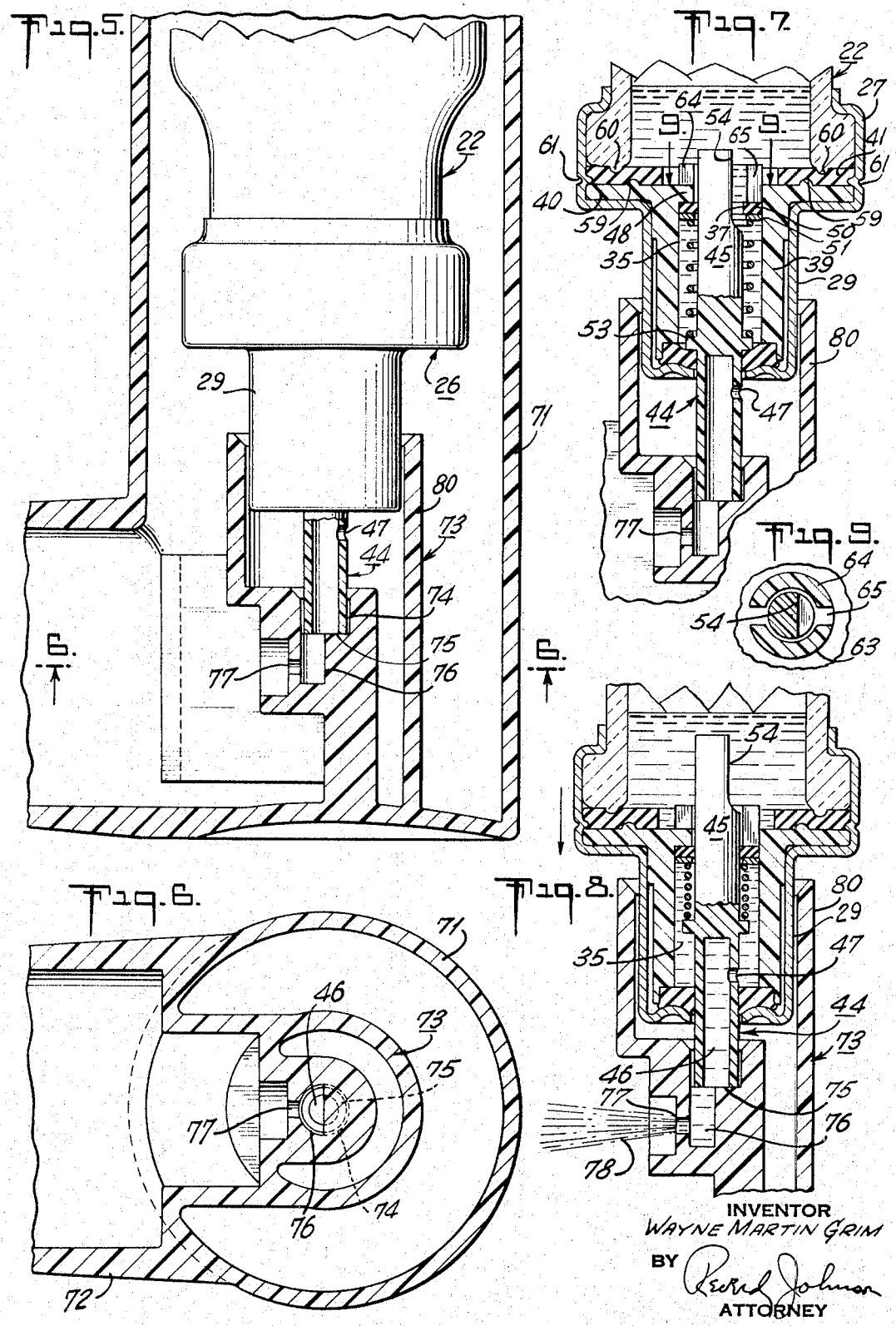

Jan. 2, 1968 W. M. GRIM 3,361,306
AEROSOL UNIT DISPENSING UNIFORM AMOUNTS
OF A MEDICALLY ACTIVE INGREDIENT
Filed March 31, 1966 3 Sheets-Sheet 3
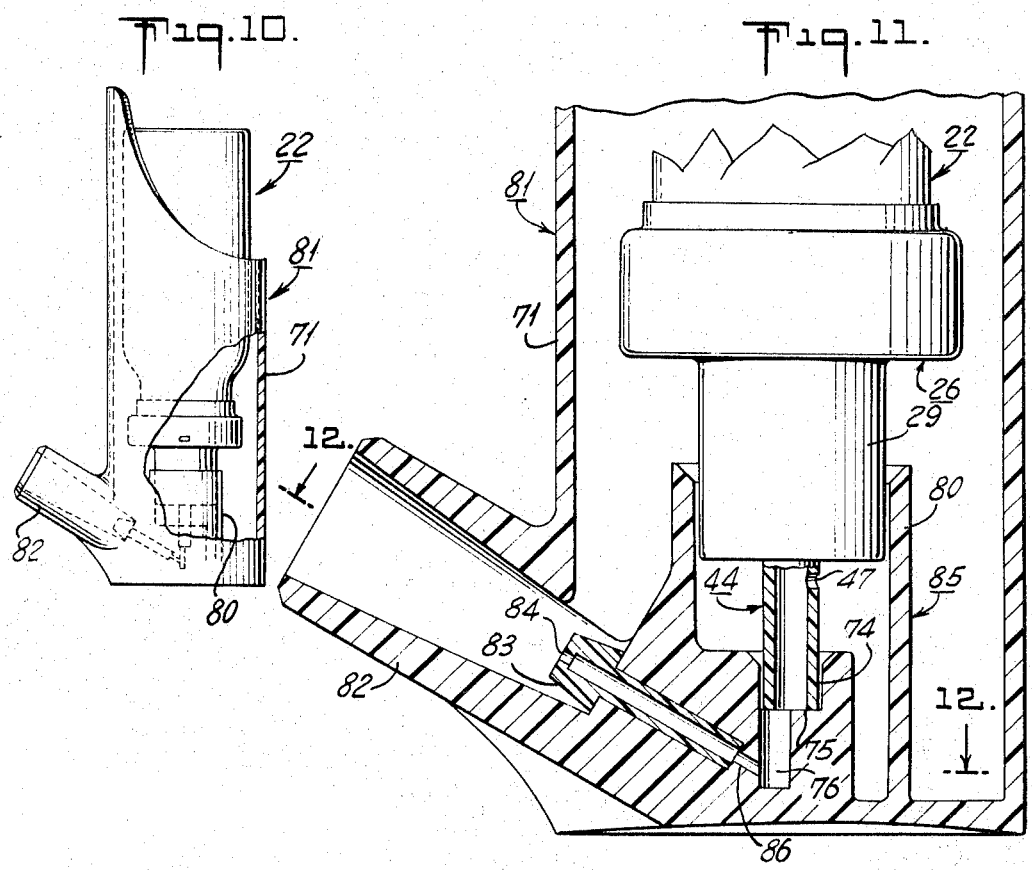
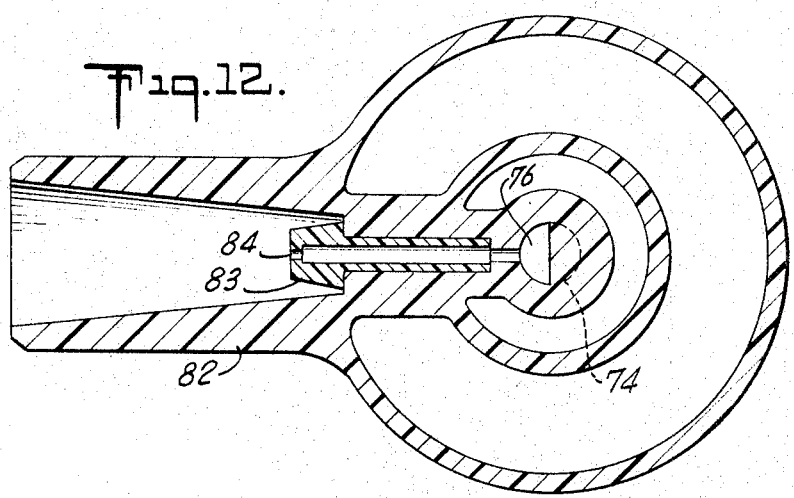
INVENTOR
WAYNE MARTIN GRIM
BY
ATTORNEY

United States Patent Office 3,361,306
Patented Jan. 2, 1968

3,361,306
AEROSOL UNIT DISPENSING UNIFORM AMOUNTS OF A MEDICALLY ACTIVE INGREDIENT
Wayne Martin Grim, Chalfont, Pa., assignor to Merck & Co., Inc., Rahway, N.J., a corporation of New Jersey
Filed Mar. 31, 1966, Ser. No. 539,190
1 Claim. (Cl. 222—402.13)

ABSTRACT OF THE DISCLOSURE

The aerosol device disclosed is for dispensing a liquid containing a medically active ingredient dissolved or suspended therein, the dispensing being in uniform amounts each containing a uniform amount of medicament, from the beginning of the use of the aerosol device through to the dispensing of the last drop of liquid in the container. A metering valve according to the principles of U.S. Patents 2,721,010 and 2,837,249 is employed, mounted so as to be outside of, and below, the container rather than inside the container, when the aerosol unit is used in the normal, inverted position, so that the entrance to the metering chamber of the valve is below the lip of the container. The case into which the container and metering valve is mounted is provided with two separate cylindrical walls extending upwardly over the respective lower portions of the metering valve and the container to make a practical and rugged unit.

---

This invention relates to aerosol devices having a metering dispensing valve for discharging from a container, when it is in the inverted position (i.e., when the original open end of the container is lowermost), a measured amount of a liquid as a mist or vapor, the liquid within the container having a liquified gaseous propellant under pressure, and also having a medically active ingredient dissolved or suspended in the liquid in the container, this medically active ingredient being thereby dispensed in uniform amounts in the mist or vapor.

The principal object of the invention is the provision of a construction for such a device which is simple, rugged and effective, which is compatible with a great variety of medically active ingredients, which will dispense a uniform amount of liquid and likewise a uniform amount of medically active ingredient for every actuation of the device, and which will dispense such uniform amounts down to practically the last drop of liquid in the container.

Other objects, and the various features of the device by which this principal object is achieved, will become evident from the following description, in conjunction with the accompanying drawings, in which:

FIGURE 1 is an elevational view, with a portion broken away, of a complete inhalation aerosol unit utilizing the construction of this invention;

FIGURE 2 is an enlarged view of the unit shown in FIG. 1, with the case of the unit in section and with the aerosol container about to be inserted into the case;

FIGURE 3 is an enlarged elevational view, partly in section, of the aerosol container and metering valve of the unit shown in FIG. 1;

FIGURE 4 is a sectional view of the device of FIG. 3 along the lines 4—4 of FIG. 3;

FIGURE 5 is an enlarged view of a portion of the unit shown in FIG. 1 with portions of the case and the discharge tube of the metering valve shown in section;

FIGURE 6 is a sectional view taken along the line 6—6 of FIG. 5;

FIGURE 7 is a view similar to FIG. 5 with the metering valve and associated parts shown in section and with the parts in their normal position;

FIGURE 8 is a view similar to FIG. 7 showing the parts when the aerosol device is moved to the actuated position to effect a discharge of a metered amount of liquid and medically active ingredient;

FIGURE 9 is a sectional view taken along the line 9—9 of FIG. 7;

FIGURE 10 is an elevational view, with a portion broken away, of a complete nasal aerosol unit utilizing the construction of this invention;

FIGURE 11 is an enlarged view partly in section of a portion of the unit shown in FIG. 10, and FIGURE 12 is a sectional view along the line 12—12 of FIG. 11.

Referring to FIGURES 1 and 2, the inhalation aerosol unit there shown consists of a case generally designated 21 and a container generally designated 22. As shown in FIG. 2, the container 22 is removable from the case 21 and can be replaced by a filled container when the contents of the container become exhausted.

The container 22, preferably a glass vial, has a neck portion 23 terminating in a lip 24 (see FIG. 3), the latter serving as the uppermost, and open end, of the container when the container is in upright position. As shown in FIGURES 1, 2 and 3, however, the container 23 is in the inverted position, which is the preferred position for aerosol dispensing of some medically active ingredients.

Secured to the lip 24, as by the crimping 25, is a metallic sleeve generally designated 26 having a cylindrical, tubular portion 27 which has its interior diameter substantially equal to the exterior diameter of the lip 24 of the container so that the cylindrical portion fits closely about the exterior of the lip. The metallic sleeve 26 has a substantially radial portion 28 extended inwardly from the lower part of the cylindrical portion 27. The metallic sleeve 26 then has a cylindrical, tubular portion 29 extending downwardly a substantial distance below the radial portion 28. At the lower end of the cylindrical, tubular portion of the metallic sleeve 26, the sleeve turns inwardly to form a shoulder portion 30 that has a central aperture 31.

This metallic sleeve 26 secures to the container 22 a metering dispensing valve generally designated 34. The principle of the metering valve shown is disclosed in U.S. Patents Nos. 2,721,010 and 2,837,249. However, in accordance with this invention, the metering chamber 35 of the metering valve is completely outside and wholly below the radial plane touching the bottom of the lip 24 of the container, with the entrance 36 for the flow of liquid from the container into the metering chamber thus being below such radial plane. Consequently, the contents of the container 22, down to practically the last drop of liquid in the container, is readily able to flow downwardly into the entrance to the metering chamber 35. There is thus no holdup or wastage of liquid in the container, which occurs in some aerosol units because the final portion of the contents of the container is unable to enter the metering chamber and be discharged therefrom by the metering aerosol valve 34.

Furthermore, the spray or mist which is discharged from the aerosol device constructed according to this invention always contains a uniform amount of the medically active ingredient, for the liquid in the container and the liquid in the aerosol metering chamber are in communication with one another when the metering valve is in normal, unactuated position. Consequently, the concentration of the medically active ingredient in the metering chamber is maintained the same as in the body of the container. Also, as the aerosol unit is moved by hand from a pocket or purse to the mouth or nose for use, this movement not only agitates the liquid in the body of the container, and in the metering chamber, but also causes movement of liquid from the container to the metering chamber, and vice versa. This tends to prevent the deposition of the medically active ingredient on surfaces wetted by the liquid, and thus avoids variations in the content of the medically active ingredient in the spray or mist discharged from the unit.

In the preferred construction for the metering valve 34 there is a cylinder 39, preferably of inert and relatively non-elastic plastic, the exterior of which is engaged by the interior surface of the cylindrical, tubular portion 29 of the metallic sleeve 26. The interior surface of the cylinder 39 forms the wall of the metering chamber 35. Cylinder 39 has a flange 40 extending radially outward which underlies and is engaged by the radial portion 28 of the metallic sleeve 26. Preferably there is an annular washer 41 of elastic material, such as rubber, interposed between the flange 40 and the lip 24 of the container.

At the lower end of the cylinder 39, and between it and the shoulder portion 30 of the metallic sleeve 26, there is positioned a relatively thick annular washer 42 of elastic material, such as rubber. The valve stem, generally designated 44, is preferably made of inert and relatively non-elastic plastic. It has a solid cylindrical portion 45 where the valve stem passes through the metering chamber 35. It also has a hollow portion 46 below the solid cylindrical portion 45, this hollow portion being the portion of the valve stem that extends downwardly below the shoulder portion 30 of the metallic sleeve 26. The hollow portion has an aperture 47 therein which is normally positioned below the shoulder portion 30. However, when the valve stem 44 is moved inwardly relative to the container 22 and the metallic sleeve 26 (as shown in FIG. 8), the aperture 47 is moved past shoulder 30 and washer 42 so that it is in communication with the metering chamber 35. The contents of the metering chamber 35 thus are discharged through the aperture 47 into the inside of the hollow portion 46 of the valve stem 44, from which the material is discharged into or onto the body, as explained hereafter.

The upper end of cylinder 39 has a small inwardly extending flange 48 terminating in an aperture 49 through which the upper end portion of valve stem 44 extends. Just beneath this flange 48 is positioned a small washer 50, of elastic material, such as rubber. Just beneath washer 50 is positioned a thin metallic washer 51. These two washers are held in position by a spring 52, preferably of stainless steel, that surrounds the solid cylindrical portion 45 of the valve stem 44. The lower end of spring 52 engages the top surface of a shoulder 53 formed on the valve stem 44. The lower surface of this shoulder 53 engages the top surface of washer 42, as shown in FIG. 3, and thereby limits the downward movement of valve stem 44.

The washers 50 and 51 have apertures through which the upper end portion of valve stem 44 extends. However, the size of the aperture in the elastic washer 50 is smaller than that in the metallic washer 51, and is such as to fit closely around the solid cylindrical portion 45 of valve stem 44 when the valve stem is in the actuated position (as shown in FIG. 8). In this actuated position the solid cylindrical portion 45 of the valve stem 44 and the elastic washer 50 form a seal to close off communication between the container 22 and the metering chamber 35.

The upper end portion of valve stem 44 is not a solid cylinder, however, but is cut away or tapered, as at 54, so that when the valve stem 44 is in its lower, normal, unactuated position as shown in FIG. 3 (and also in FIG. 7), there is an opening 37 between the upper end 54 of the valve stem 44 and the elastic washer 50.

Opening 36, between the upper end 54 of valve stem 44 and the inwardly extending flange 48 of cylinder 39, together with opening 37 (just below opening 36, between the upper end 59 of valve stem 44 and elastic washer 44), thus provide the entrance for the flow of liquid from the container 22 into the metering chamber 35, when the valve stem 44 is in its lower, normal, unactuated position.

As explained previously, this entrance for the flow of liquid from the container 22 into the metering chamber 35 is wholly below the radial plane touching the bottom of the lip 24 of the container 22.

If desired, the upper surface of the flange 40 may be tapered downwardly toward the aperture 49, as shown at 56, so as to assist in drawing all of the liquid from the container 22 into the opening 36.

The detailed description so far has been largely directed to the container 22, to the aerosol metering valve 34, and to the physical relationship of these elements.

The description now turns to the receptacles or cases in which the containers are mounted for operation.

FIGURES 1, 2, 5, 6, 7 and 8 relates to an inhalation aerosol unit, while FIGURES 10, 11 and 12 relate to a nasal aerosol unit.

The construction of the metering valve shown in FIGURES 7 and 8 is slightly different from that shown and described in FIGURE 3, but in operation the two constructions are essentially identical.

It is deemed sufficient to note that in the FIGURES 7 and 8 construction, the cylinder 39 is not in engagement with the interior of the cylindrical, tubular portion 29 of the metallic sleeve for its full length (as it is in the FIGURE 3 construction). Also, the upper surface of the flange 40 of cylinder 39 in the FIGURES 7 and 8 construction has an upstanding rib 59 for 360 degrees around the surface, and the bottom surface of lip 24 of the container 22 has a downwardly extending rib 60 for 360 degrees around the lip. The rib 59 is positioned at a radius from the longitudinal axis of the container and valve which is slightly less than that for rib 60. Hence, these two ribs 59 and 60 together concentrate the clamping pressure of the valve unit upon the container to a small area of the annular sealing washer 41 and thereby readily effect a tight seal between the parts.

Another difference is that in the FIGURES 7 and 8 construction indentations 61 are made in the cylindrical portion 27 of the metallic sleeve 26 to secure the plastic cylinder 39 in position after assembly of the valve.

A final difference is in the construction of the cylinder 39 in the region where the upper portion 54 of the valve stem extends through the area of the inwardly extending flange 48. The cylinder 39 has two arcuate bosses 63 and 64 integral with the cylinder (see also FIGURE 9), which extend slightly above the upper surface of the flange 48. Between one pair of ends of the bosses the flange 48 is further apertured by a slot-like opening 65 that extends down to the washer 50. This insures that the flow-controlling opening between the chamber 22 and the metering chamber 35 is the opening 37 between the upper end 54 of valve stem 44 and the elastic washer 50.

Referring now to the inhalation aerosol unit shown in FIGURES 1, 2, 5, 6, 7 and 8, the case 21 includes a tubular portion 71, the axis of which is substantially vertical when the unit is in position for normal use and a tubular portion 72, the axis of which is substantially horizontal when the unit is in position for normal use, this horizontal tubular portion 72 being positioned at the bottom of the vertical tubular porition 71.

The case 21 also includes a complete structure, generally designated 73, in the interior of the case at the junction of the vertical tubular portion 71 with the horizontal tubular portion 72.

This structure 73 has a well 74 into which the lower end of the valve stem 44 fits, with the bottom of the valve stem engaging a shoulder 75 which extends part way across the opening in the valve stem. The container 22 and its valve assembly are thus supported by valve stem 44 upon this shoulder 75. The bottom of the well 74 not closed by the shoulder 75 communicates with a passageway 76 which leads to the discharge orifice 77 that forms and directs a spray or mist 78 horizontally along the interior of the horizontal tubular portion 72 of the case, whenever the contents of the metering chamber 35 are discharged down the hollow portion 46 of valve stem 44, as indicated in FIGURE 8. This occurs when the person using the unit depresses the top of the container 22 so as to move the container and valve assembly from the normal, unactuated position shown in FIGURE 7, to the depressed, actuated position shown in FIGURE 8.

The diameter of the main body of container 22 is sufficiently smaller than the interior diameter of the vertical tubular portion 71 that there is normally a significant clearance between the two throughout most, if not all, of the periphery of the container. This insures that an adequate supply of air may flow down alongside the container into the bottom of the case 22 and then mix with the liquid discharged from the orifice 77 to form an appropriate spray or mist.

Structure 73 at the bottom of tubular portion 71 also has an inner vertical tubular portion 80, concentric with tubular portion 71, that extends upwardly a distance sufficient to overlie the lower portion of cylindrical tubular portion 29 of metallic sleeve 26 when the valve stem is seated in the well 74 and the parts are in normal, unactuated position, as shown in FIGURES 5 and 7. The interior diameter of this inner tubular portion 80 is slightly larger than the exterior diameter of the tubular portion 29 so as not to interfere with the seating of the valve stem 44 in the well 74. This inner tubular portion 80 thus tends to guide the valve stem into the well when the container 22 is inserted in the case 21, for the lower end of the tubular portion 29 is below the upper end of inner tubular portion 80 when the bottom end of valve stem 44 starts to move into well 74. Also, when the unit is in actuated position, as shown in FIGURE 8, the inner tubular portion 80 tends to restrain lateral movement of the valve, and tipping movement of the container, each of which exerts a strain on the valve stem and subjects it to the possibility of breaking off.

The long, downwardly extending, cylindrical tubular portion 29 thus not only houses the metering chamber completely below the lip of the container, but also serves, in cooperation with the inner tubular portion 80 of the case, to facilitate the proper assembly of the container in the case, and to prevent the breaking off of the valve stem 44 during the assembly of the container in the case, and during the use of the unit.

Referring now to the nasal aerosol unit shown in FIGURES 10, 11 and 12, the elements thereof that correspond with those in the inhalation aerosol unit shown in FIGURES 1, 2, 5, 6, 7 and 8 are similarly numbered, so that a detailed description of those elements as they appear in this nasal unit and of their operation, is unnecessary. It is evident from an examination of the drawings that the container 22, metallic sleeve 26, cylindrical tubular portion 29, valve stem 44 and the interior construction of the aerosol metering valve are identical in construction and operation.

The case 81 of the nasal unit differs from the case 21 of the inhalation unit. It has a similar vertical tubular portion 71. However, instead of the horizontal tubular portion 72 of the inhalation unit, the nasal unit has a discharge tube 82 of smaller exterior diameter, so as to fit into the nostril, and the axis of this discharge tube 82 is inclined upwardly from the horizontal approximately 30 degrees. The interior of the discharge tube 82 is flared outwardly, as shown in FIGURES 11 and 12. At the bottom of the discharge tube 82 there is preferably an elongated nozzle element 83 that tends to keep the spray discharged from the orifice 84 from contacting the interior, flared wall of the discharge tube 82 and so tends to keep to the specified standard the amount of spray entering the nostril with each actuation of the unit.

The complex structure generally designated 85 at the bottom of the vertical tubular portion 71 of case 81 is essentially similar to the corresponding structure 73 of the inhalation unit. It has a well 74 for receiving the lower end of valve stem 44, a shoulder 75 which is engaged by that lower end, and a downwardly extending passageway 76 which leads to an inclined passageway 86 into which the nozzle element 83 is positioned.

The structure 85 also has an inner vertical tubular portion 80 which cooperates with the cylindrical tubular portion 29 of metallic sleeve 26, similarly as do the corresponding parts of the inhalation unit.

An important feature of the construction of this invention is that the normal differences in the internal diameter of commercially made glass bottles or vials used for the containers 22 have no effect upon the assembling of the metering valves upon the containers, or upon the operation of the assembled units. Glass bottles or vials are preferred as the containers, as they are inert to most medically active ingredients. Inasmuch as the contents of the glass bottles or vials are under pressure, the bottles or vials are preferably coated on the exterior with a plastic to reduce the chances of breakage, and also of dispersion of broken fragments, if broken. This plastic may be opaque so as to protect the contents of the bottle or vial from light, which in some cases may cause deterioration of the medically active ingredient. Alternatively, the bottle or vial may be coated with two coats of plastic, the first or inside coat being clear or translucent, and the second or outside coat being opaque, with the opaque coat extending from the bottom of the bottle or vial almost to, but stopping just short of, the lip of the bottle or vial so as to leave a window-like ring at the neck through which the liquid in the bottle or vial may be seen. This window enables the user to readily determine when he needs to obtain a replacement bottle or vial. If this window is provided, the bottle or vial may be made of amber glass to insure that any light which may pass through the window is relatively harmless to the medically active ingredient in the container.

I claim:

1. In an aerosol device having a metering dispensing valve (34) for discharging multiple measured amounts of a liquid from a container (22) while the container is in the inverted position with its original open end lowermost, the liquid in the container including a liquified gaseous propellant under pressure, and also including a medically active ingredient dissolved or suspended therein, the metering dispensing valve, without a dip tube, being secured by suitable means (26) to the lip of the original open end of the container to close the same and having a metering chamber (35) with an entrance (37) thereto at its uppermost end which is in direct and ready communication with the interior of the container when the aerosol device, and its velve stem (44), are in normal, unactuated position, the metering dispensing valve, when the aerosol device and its valve stem are in depressed, actuated position, closing such entrance (37) and opening a passageway (47) for the discharge of the contents of the metering chamber through its valve stem, which projects downwardly from the aerosol device, into and through an orifice (77 of FIG. 5 or 84 of FIG. 11) to form a spray or mist, and wherein the container and the metering dispensing valve secured thereto with the valve stem projecting downwardly therefrom, is supported inside a case (21 of FIG. 1 or 81 of FIG. 11) by means of a well (74), near the bottom of a vertical tubular portion (80) of the case, into which the lower end of the valve stem fits, with the bottom of the well having a shoulder (75) engaging the lowermost end of the valve stem, the improvement in such device wherein:

(a) the means (26) securing the metering dispensing valve to the lip of the container serves to secure the metering dispensing valve (34) so that the metering chamber (35) is completely outside the container (22) and wholly below a plane touching the bottom of the lip (24) of the container around its periphery and with the entrance (37) to the metering chamber below such plane when the container is in the inverted position;

(b) the means (26) securing the metering dispensing valve to the lip of the container has a cylindrical portion (29) below the lip (24) of the container, which cylindrical portion (29) surrounds the metering chamber (35) of the valve;

(c) the case (21 of FIG. 1 or 81 of FIG. 11) has an inner cylindrical wall (80) projecting upwardly from the top of the well (74) with a diameter only slightly larger than the exterior diameter of said cylindrical portion (29) of the securing means, the upward projection of said wall being sufficiently above the top of the well to extend upwardly about one-half of the axial length of the cylindrical portion (29) surrounding the metering chamber (35) when the container (22) is mounted in the case (21 of FIG. 1 or 81 of FIG. 11) ready for operation; and (d) the case (21 of FIG. 1 or 81 of FIG. 11) extends upwardly to surround and cover not less than the lower half of the container (22) when the container (22) is mounted on the case ready for operation;

whereby a simple, practical, rugged construction is provided by which:

(i) the complete contents of the container are dischargeable therefrom; and (ii) all the contents of the metering chamber are in easy communication with all the contents of the container down to substantially the last drop of liquid in the conainer when the aerosol device is in the normal, unactuated position and the container is in the inverted position, so that each measured amount of liquid discharged from the device contains a uniform amount of the medically active ingredient down to practically the last drop of liquid in the container.

References Cited

UNITED STATES PATENTS

| | | | |
|---|---|---|---|
| 2,864,538 | 12/1958 | Rasmussen | 222—453 |
| 2,974,453 | 3/1961 | Meshberg | 222—402.2 |
| 3,001,524 | 9/1961 | Maison et al. | 222—402.2 |
| 3,012,555 | 12/1961 | Meshberg | 222—402.13 |
| 3,198,404 | 8/1965 | Welches | 222—402.2 |

ROBERT B. REEVES, *Primary Examiner.*

F. R. HANDREN, *Assistant Examiner.*